US011335115B2

(12) United States Patent
Lee

(10) Patent No.: US 11,335,115 B2
(45) Date of Patent: May 17, 2022

(54) FAKE FINGERPRINT IDENTIFICATION DEVICE AND METHOD FOR DRIVING THE SAME

(71) Applicant: Seung Jin Lee, Yongin-si (KR)

(72) Inventor: Seung Jin Lee, Yongin-si (KR)

( * ) Notice: Subject to any disclaimer, the term of this patent is extended or adjusted under 35 U.S.C. 154(b) by 0 days.

(21) Appl. No.: 17/257,543

(22) PCT Filed: Jan. 22, 2019

(86) PCT No.: PCT/KR2019/000930
§ 371 (c)(1),
(2) Date: Dec. 31, 2020

(87) PCT Pub. No.: WO2020/009300
PCT Pub. Date: Jan. 9, 2020

(65) Prior Publication Data
US 2021/0286971 A1    Sep. 16, 2021

(30) Foreign Application Priority Data

Jul. 3, 2018 (KR) .................. 10-2018-0077062

(51) Int. Cl.
*G06K 9/20* (2006.01)
*G06K 9/36* (2006.01)
*G06V 40/12* (2022.01)
*G06V 40/40* (2022.01)
*G06V 40/13* (2022.01)
*G06V 40/10* (2022.01)

(52) U.S. Cl.
CPC ...... *G06V 40/1365* (2022.01); *G06V 40/1306* (2022.01); *G06V 40/1394* (2022.01); *G06V 40/45* (2022.01); *G06V 40/15* (2022.01)

(58) Field of Classification Search
CPC ............ G06K 9/00107; G06K 9/0002; G06K 9/00006–9/0012; G06K 2009/00939; G06V 40/1306; G06V 40/1382–40/1394
See application file for complete search history.

(56) References Cited

U.S. PATENT DOCUMENTS

| | | | | |
|---|---|---|---|---|
| 5,990,804 A | * | 11/1999 | Koyama | ............... G06K 9/0012 331/65 |
| 2013/0136321 A1 | * | 5/2013 | Lee | ...................... G06K 9/0012 382/124 |

FOREIGN PATENT DOCUMENTS

| | | |
|---|---|---|
| KR | 100940902 B1 | 2/2010 |
| KR | 101288178 B1 | 7/2013 |
| KR | 101296579 B1 | 8/2013 |
| KR | 1020130108461 A | 10/2013 |

(Continued)

*Primary Examiner* — Brian Werner
(74) *Attorney, Agent, or Firm* — Rabin & Berdo, P.C.

(57) ABSTRACT

A fingerprint recognition technology is disclosed. More specifically, embodiments of the present invention provide a fake fingerprint identification device and a method for driving the identification device. According to the device and the method, an alternating voltage is applied to read a fingerprint such that the fingerprint is identified and physical authentication is made whether the fingerprint is live or fake when the frequency of a TX or RX ultrasonic signal generated by the application of the alternating voltage varies. Therefore, the device and the method can be used to accurately identify whether a fingerprint is live or fake and is thus effective in preventing harmful effects caused when a fake fingerprint is authenticated.

7 Claims, 2 Drawing Sheets

(56) References Cited

FOREIGN PATENT DOCUMENTS

| KR | 1020150110413 A | 10/2015 |
|----|-----------------|---------|
| KR | 1020160117861 A | 10/2016 |
| KR | 1020170104909 A | 9/2017 |
| KR | 101828800 B1 | 2/2018 |
| KR | 1020180061826 A | 6/2018 |

\* cited by examiner

[Fig. 1]
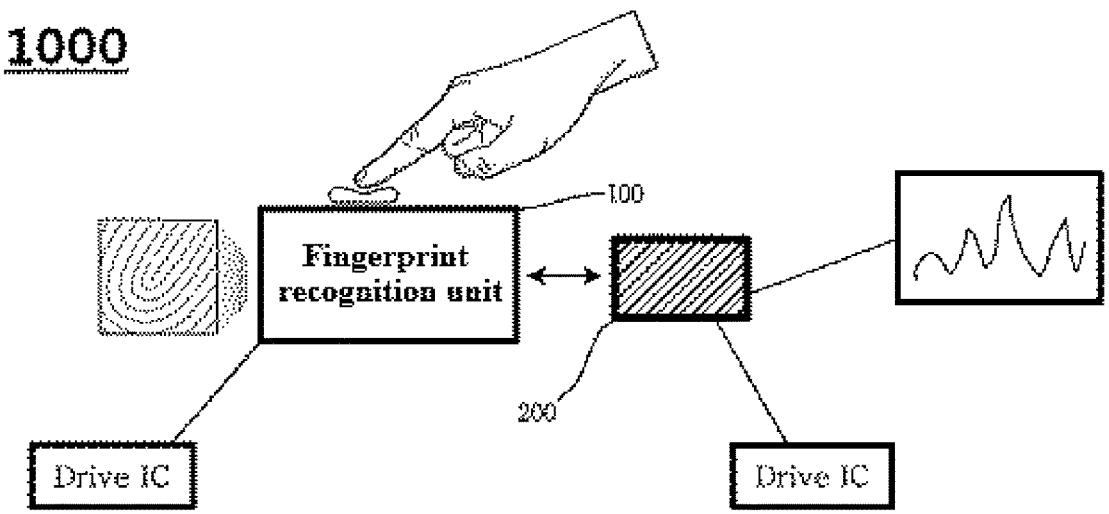
[Fig. 2]
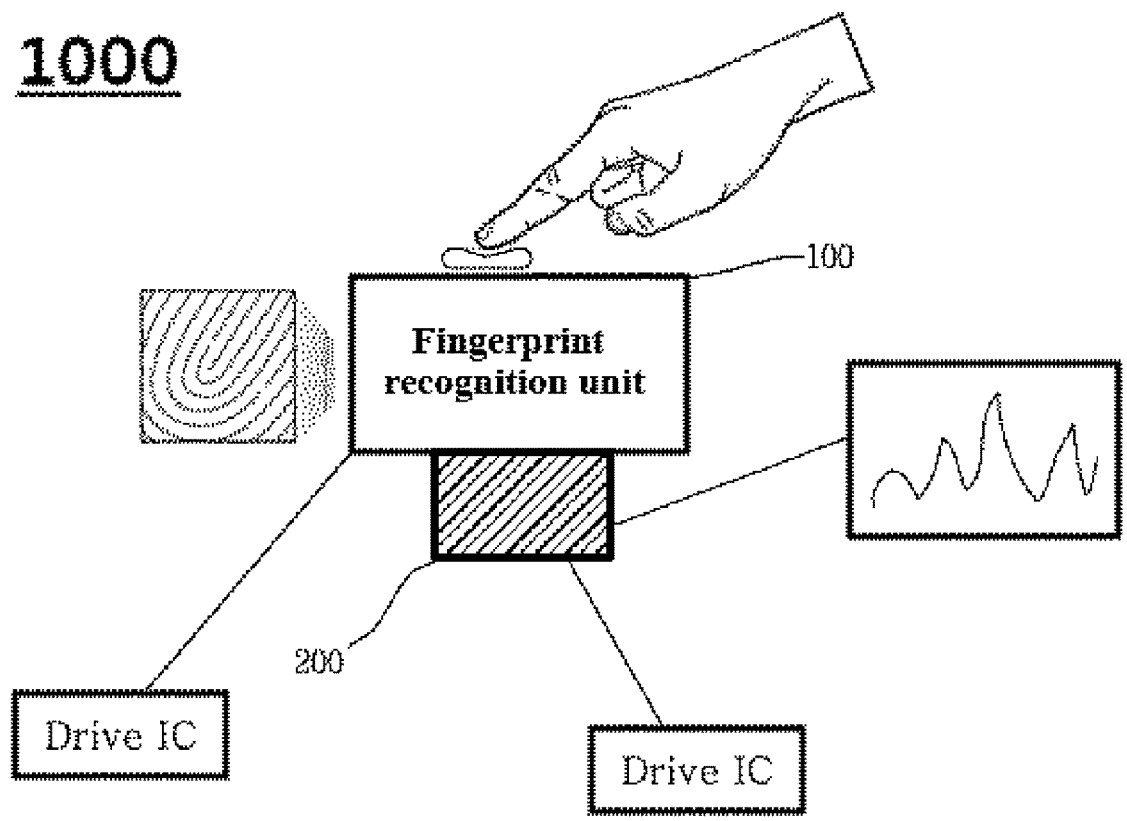

[Fig. 3]
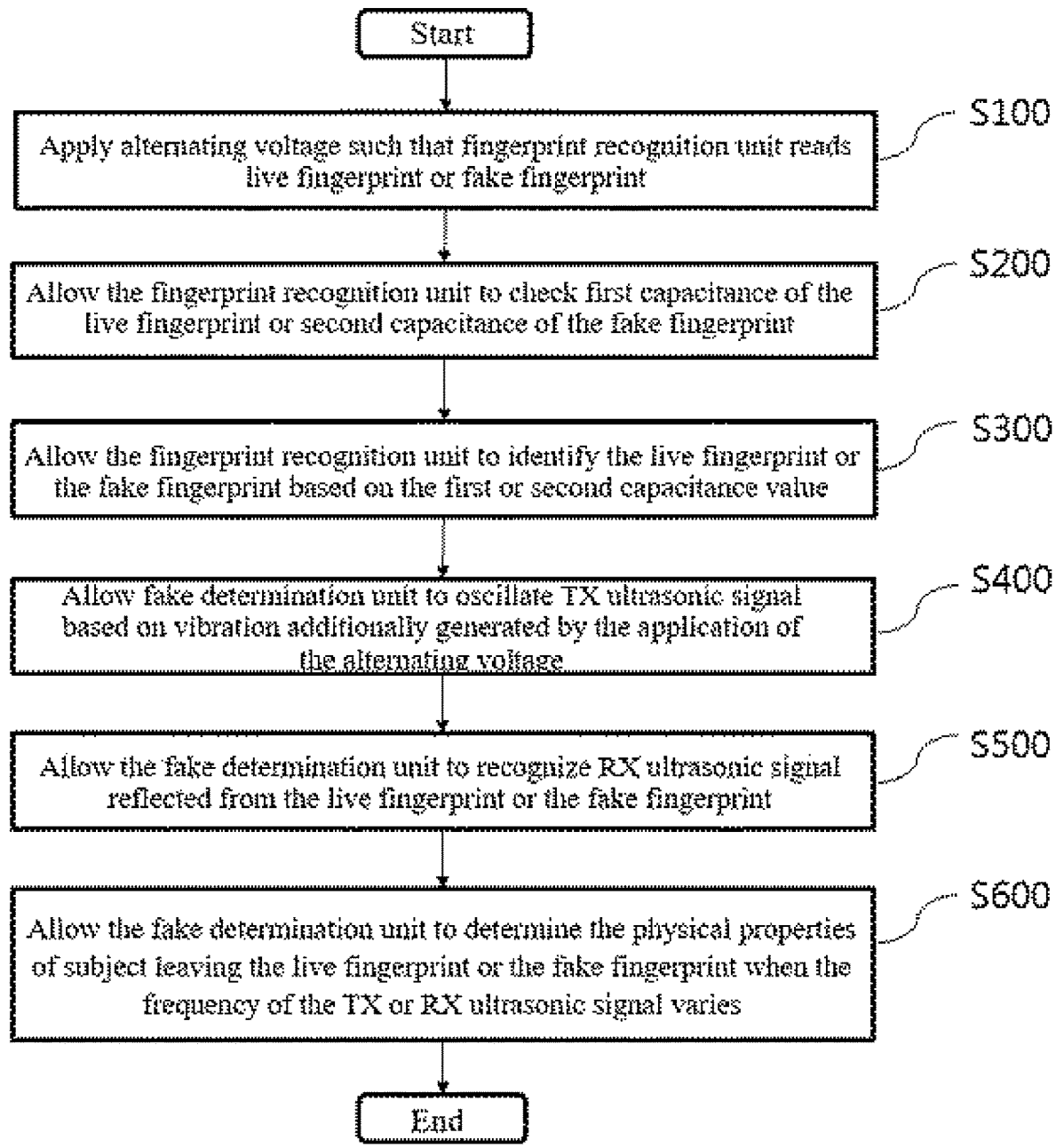

FAKE FINGERPRINT IDENTIFICATION DEVICE AND METHOD FOR DRIVING THE SAME

TECHNICAL FIELD

The present invention discloses a fingerprint recognition technology. More specifically, embodiments of the present invention relate to a fake fingerprint identification device and a method for driving the identification device in which an alternating voltage is applied to read a fingerprint such that the fingerprint is identified and physical authentication is made whether the fingerprint is live or fake when the frequency of a TX or RX ultrasonic signal generated by the application of the alternating voltage varies.

BACKGROUND ART

In recent years, many biometric security methods have been introduced. The applications of biometric security methods to electronic terminals, particularly smartphones, have become more diverse and the demand for biometric security methods have also increased. In this situation, fingerprint recognition as one of these biometric security methods has been widely used and popularized for access control security or use control security of electronic terminals.

The principle of fingerprint recognition security is based on the use of various devices, such as optical, capacitive, heat sensitive, and semiconductor devices. The fingerprint recognition devices are selectively employed depending on situations where the devices are applied and the characteristics of the fingerprint recognition principle.

However, there is a high possibility that fingerprint recognition security systems may be forged despite their usefulness. For example, fake fingers made by fingerprint molding may be used to easily trick security systems. Such fake fingers include silicone rubber fingers. Other examples include gummy fingers and artificial fingers made of molding plastics and gelatin. These fake fingers can be used to easily penetrate conventional fingerprint recognition security systems due to their very high fingerprint recognition rates.

The prior art describes only the differences between characteristic signals of a live finger and features a fake finger and fails to specifically describe how to distinguish a live finger from a fake finger and how different the characteristics of a live finger are from those of a fake finger. The prior art does not describe the impedance characteristics of a live finger and a fake finger in response to changes in frequency.

Thus, there is a need to investigate an improved fingerprint recognition sensor by elucidating the differences between a fake finger and a live finger and authenticating whether the finger is live or fake based on the differences.

PRIOR ART DOCUMENTS

Patent Documents

Korean Patent Publication No. 10-2016-0117861
Korean Patent No. 10-0940902-0000
Korean Patent Publication No. 10-2013-0108461
Korean Patent Publication No. 10-2015-0110413

DISCLOSURE OF INVENTION

Technical Problem

The present invention discloses a fingerprint recognition technology. Specifically, the present invention has been made in an effort to solve the problems of the prior art and a first object of the present invention is to provide a fake fingerprint identification device and a method for driving the identification device in which an alternating voltage is applied to read a fingerprint such that the fingerprint is identified and physical authentication is made whether the fingerprint is live or fake when the frequency of a TX or RX ultrasonic signal generated by the application of the alternating voltage varies, with the result that it can be accurately identified whether the fingerprint is live or fake to prevent harmful effects caused when a fake fingerprint is authenticated.

A second object of the present invention is to provide a fake fingerprint identification device and a method for driving the identification device in which first and second impedance values are measured based on different first and second vector data defined by x-, y-, and z-axes from an RX ultrasonic signal from a live fingerprint transferred from the epidermis of a finger and an RX ultrasonic signal from a fake fingerprint, respectively, and are then compared with the human body impedance to accurately determine whether the fingerprint is fake or live, so that malicious or illegal copying of fingerprints can be completely eradicated.

A third object of the present invention is to provide a fake fingerprint identification device and a method for driving the identification device in which when first and second impedance values converge within the error range of the human body impedance, it is determined whether the amount of blood flowing through a fingerprint is measured or lies within the error range of a predetermined reference amount of blood to clearly identify whether the fingerprint is live or fake, so that errors caused by various factors such as user environment and conditions can be minimized, and as a result, the recognition rate of the live fingerprint can be maximized, which proposes system improvements for social health and fair competition to contribute to industrial development.

Solution to Problem

In order to achieve these objects, the present invention includes the following constructions.

Specifically, a fake fingerprint identification device according to one embodiment of the present invention includes: a fingerprint recognition unit reading a live fingerprint or a fake fingerprint by the application of an alternating voltage to check a first capacitance of the live fingerprint or a second capacitance of the fake fingerprint and identifying the live fingerprint or the fake fingerprint based on the first or second capacitance value; and a fake determination unit oscillating a TX ultrasonic signal based on vibration additionally generated by the application of the alternating voltage, recognizing an RX ultrasonic signal reflected from the live fingerprint or the fake fingerprint, and determining the physical properties of a subject leaving the live fingerprint or the fake fingerprint to physically authenticate the live fingerprint or the fake fingerprint when the frequency of the TX or RX ultrasonic signal varies.

A method for driving the fake fingerprint identification device includes: applying an alternating voltage to allow the fingerprint recognition unit to read a live fingerprint or a fake fingerprint to check a first capacitance of the live fingerprint or a second capacitance of the fake fingerprint and to identify the live fingerprint or the fake fingerprint based on the first or second capacitance value; allowing the fake determination unit to oscillate a TX ultrasonic signal based on vibration additionally generated by the application of the alternating voltage and to recognize an RX ultrasonic signal reflected from the live fingerprint or the fake fingerprint; and allowing the fake determination unit to determine the physical properties of a subject leaving the live fingerprint or the fake fingerprint to physically authenticate the live fingerprint or the fake fingerprint when the frequency of the TX or RX ultrasonic signal varies.

Advantageous Effects of Invention

According to the device and the method of the present invention, an alternating voltage is applied to read a fingerprint such that the fingerprint is identified and physical authentication is made whether the fingerprint is live or fake when the frequency of a TX or RX ultrasonic signal generated by the application of the alternating voltage varies. Therefore, the device and the method of the present invention can be used to accurately identify whether a fingerprint is live or fake and is thus effective in preventing harmful effects caused when a fake fingerprint is authenticated ("first effect").

According to the device and the method of the present invention, first and second impedance values are measured based on different first and second vector data defined by x-, y-, and z-axes from an RX ultrasonic signal from a live fingerprint transferred from the epidermis of a finger and an RX ultrasonic signal from a fake fingerprint, respectively, and are then compared with the human body impedance to accurately determine whether the fingerprint is fake or live. Therefore, the device and the method of the present invention can completely eradicate malicious or illegal copying of fingerprints ("second effect").

According to the device and the method of the present invention, when first and second impedance values converge within the error range of the human body impedance, it is determined whether the amount of blood flowing through a fingerprint is measured or lies within the error range of a predetermined reference amount of blood to clearly identify whether the fingerprint is live or fake, so that errors caused by various factors such as user environment and conditions can be minimized, and as a result, the recognition rate of the live fingerprint can be maximized. Therefore, the device and the method of the present invention can propose system improvements for social health and fair competition, contributing to industrial development ("third effect").

BRIEF DESCRIPTION OF DRAWINGS

FIG. 1 illustrates a fake fingerprint identification device according to one embodiment of the present invention.

FIG. 2 illustrates a fake fingerprint identification device according to a further embodiment of the present invention.

FIG. 3 is a flowchart illustrating a method for driving a fake fingerprint identification device according to one embodiment of the present invention.

MODE FOR THE INVENTION

Embodiments

Exemplary embodiments of the present invention will now be described in detail with reference to the accompanying drawings.

FIG. 1 illustrates a fake fingerprint identification device according to one embodiment of the present invention.

Referring to FIG. 1, the fake fingerprint identification device 1000 includes a fingerprint recognition unit 100 and a fake determination unit 200. According to the fake fingerprint identification device 1000, an alternating voltage is applied to read a fingerprint such that the fingerprint is identified and physical authentication is made whether the fingerprint is live or fake when the frequency of a TX or RX ultrasonic signal generated by the application of the alternating voltage varies.

An alternating voltage is applied to allow the fingerprint recognition unit 100 to read a live fingerprint or a fake fingerprint to check a first capacitance of the live fingerprint or a second capacitance of the fake fingerprint and to identify the live fingerprint or the fake fingerprint based on the first or second capacitance value.

The fake determination unit 200 oscillates a TX ultrasonic signal based on vibration additionally generated by the application of the alternating voltage and recognizes an RX ultrasonic signal reflected from the live fingerprint or the fake fingerprint, as illustrated in FIG. 2.

The fake determination unit 200 determines the physical properties of a subject leaving the live fingerprint or the fake fingerprint to physically authenticate the live fingerprint or the fake fingerprint when the frequency of the TX or RX ultrasonic signal varies.

The fake determination unit 200 measures first and second impedance values based on different first and second vector data defined by x-, y-, and z-axes from the RX ultrasonic signal from the live fingerprint transferred from the epidermis of a finger and the RX ultrasonic signal from the fake fingerprint fitted onto the finger, respectively.

The fake determination unit 200 compares the first and second impedance values with a predetermined human body impedance and determines the first and second impedance values as those of the fake fingerprint when the first and second impedance values are outside the error range of the human body impedance.

The fake determination unit 200 determines whether the amount of blood flowing through the fingerprint is measured or lies within the error range of a predetermined reference amount of blood to clearly identify whether the fingerprint is live or fake when the first and second impedance values converge within the error range of the human body impedance.

Herein, it is noted that the first vector data indicate 3-dimensional vector values representing characteristics values of a friction speed and a refraction direction induced when the live fingerprint transferred from the epidermis of the finger is in contact with an air layer. It is also noted that the second vector data indicate different 3-dimensional vector values representing characteristics values of a different friction speed and a different refraction direction induced when the fake fingerprint fitted onto the finger is in contact with an air layer.

The fake determination unit 200 determines whether the subject leaving the live fingerprint or the fake fingerprint is a gas, liquid or solid when the physical properties of the subject is identified and compares the reference capacitance of the live fingerprint measured by the fingerprint recognition unit 100 with the capacitance of the subject to numerically authenticate whether the fingerprint is live or fake.

The fake determination unit 200 is made of a piezoelectric material, such as a piezoelectric ceramic powder. Examples of such piezoelectric ceramics include lead zirconate titanate (PZT), barium titanate, lead titanate, lead zirconate, lead niobium titanate (PNT), and lead scandium niobium titanate (PSNT).

FIG. 3 is a flowchart illustrating a method for driving the fake fingerprint identification device according to one embodiment of the present invention.

Referring to FIG. 3, according to the method, an alternating voltage is applied to read a live fingerprint or a fake fingerprint such that the live fingerprint or the fake fingerprint is identified, and the live fingerprint or the fake fingerprint is physically authenticated when the frequency of a TX or RX ultrasonic signal generated by the application of the alternating voltage varies.

First, an alternating voltage is applied to allow the fingerprint recognition unit to read a live fingerprint or a fake fingerprint to check a first capacitance of the live fingerprint or a second capacitance of the fake fingerprint and to identify the live fingerprint or the fake fingerprint based on the first or second capacitance value (S100, S200, and S300).

The fake determination unit is allowed to oscillate a TX ultrasonic signal based on vibration additionally generated by the application of the alternating voltage and to recognize an RX ultrasonic signal reflected from the live fingerprint or the fake fingerprint (S400 and S500).

The fake determination unit is allowed to determine the physical properties of a subject leaving the live fingerprint or the fake fingerprint to physically authenticate the live fingerprint or the fake fingerprint when the frequency of the TX or RX ultrasonic signal varies (S600).

The method further includes the following operations, which are easy to carry out.

Specifically, the fake determination unit is allowed to measure first and second impedance values based on different first and second vector data defined by x-, y-, and z-axes from the RX ultrasonic signal from the live fingerprint transferred from the epidermis of a finger and the RX ultrasonic signal from the fake fingerprint fitted onto the finger, respectively.

The fake determination unit is allowed to compare the first and second impedance values with a predetermined human body impedance and determines the first and second impedance values as those of the fake fingerprint when the first and second impedance values are outside the error range of the human body impedance.

The fake determination unit is allowed to determine whether the amount of blood flowing through the fingerprint is measured or lies within the error range of a predetermined reference amount of blood to identify whether the fingerprint is live or fake when the first and second impedance values converge within the error range of the human body impedance.

While the invention has been described with reference to preferred embodiments thereof, those skilled in the art will appreciate that various changes and modifications can be made thereto without departing from the spirit and scope of the invention as set forth in the appended claims.

LIST OF REFERENCE NUMERALS

1000: Fake fingerprint identification device
100: Fingerprint recognition unit 200: Fake determination unit

The invention claimed is:

1. A fake fingerprint identification device comprising:
a fingerprint recognition circuit reading a live fingerprint or a fake fingerprint by the application of an alternating voltage to check a first capacitance of the live fingerprint or a second capacitance of the fake fingerprint and identifying the live fingerprint or the fake fingerprint based on the first or second capacitance value; and
a fake determination circuit oscillating a TX ultrasonic signal based on vibration additionally generated by the application of the alternating voltage, recognizing an RX ultrasonic signal reflected from the live fingerprint or the fake fingerprint, and determining physical properties of a subject leaving the live fingerprint or the fake fingerprint to physically authenticate the live fingerprint or the fake fingerprint when a frequency of the TX or RX ultrasonic signal varies.

2. The fake fingerprint identification device according to claim 1, wherein the fake determination circuit measures first and second impedance values based on different first and second vector data defined by x-, y-, and z-axes from the RX ultrasonic signal from the live fingerprint transferred from an epidermis of a finger and the RX ultrasonic signal from the fake fingerprint fitted onto the finger, respectively, or measures an amount of blood flowing through the live fingerprint.

3. The fake fingerprint identification device according to claim 2, wherein the first vector data indicate 3-dimensional vector values representing characteristics values of a friction speed and a refraction direction induced when the live fingerprint transferred from the epidermis of the finger is in contact with an air layer and the second vector data indicate different 3-dimensional vector values representing characteristics values of a different friction speed and a different refraction direction induced when the fake fingerprint fitted onto the finger is in contact with an air layer.

4. The fake fingerprint identification device according to claim 2, wherein the fake determination circuit compares the first and second impedance values with a predetermined human body impedance and determines the first and second impedance values as those of the fake fingerprint when the first and second impedance values are outside an error range of the human body impedance and wherein the fake determination circuit determines whether the amount of blood flowing through the fingerprint is measured or lies within an error range of a predetermined reference amount of blood to identify whether the fingerprint is live or fake when the first and second impedance values converge within the error range of the human body impedance.

5. The fake fingerprint identification device according to claim 1, wherein the fake determination circuit determines whether the subject leaving the live fingerprint or the fake fingerprint is a gas, liquid or solid when the physical properties of the subject are identified and compares a reference capacitance of the live fingerprint measured by the fingerprint recognition circuit with a capacitance of the subject to numerically authenticate whether the fingerprint is live or fake.

6. A method for driving the fake fingerprint identification device according to claim 1, the method comprising:
applying an alternating voltage to allow the fingerprint recognition circuit to read the live fingerprint or the fake fingerprint to check the first capacitance of the live fingerprint or the second capacitance of the fake fingerprint and to identify the live fingerprint or the fake fingerprint based on the first or second capacitance value;
allowing the fake determination circuit to oscillate the TX ultrasonic signal based on vibration additionally generated by the application of the alternating voltage and to recognize the RX ultrasonic signal reflected from the live fingerprint or the fake fingerprint; and allowing the fake determination circuit to determine the physical properties of a subject leaving the live fingerprint or the fake fingerprint to physically authenticate the live fingerprint or the fake fingerprint when the frequency of the TX or RX ultrasonic signal varies.

7. The method according to claim 6, further comprising:

allowing the fake determination circuit to measure first and second impedance values based on different first and second vector data defined by x-, y-, and z-axes from the RX ultrasonic signal from the live fingerprint transferred from an epidermis of a finger and the RX ultrasonic signal from the fake fingerprint fitted onto the finger, respectively;

allowing the fake determination circuit to compare the first and second impedance values with a predetermined human body impedance and to determine the first and second impedance values as those of the fake fingerprint when the first and second impedance values are outside an error range of the human body impedance; and allowing the fake determination circuit to determine whether an amount of blood flowing through the fingerprint is measured or lies within an error range of a predetermined reference amount of blood to identify whether the fingerprint is live or fake when the first and second impedance values converge within the error range of the human body impedance.

\* \* \* \* \*